US012289405B2

(12) United States Patent
Ong et al.

(10) Patent No.: US 12,289,405 B2
(45) Date of Patent: Apr. 29, 2025

(54) GRAPHICAL WATERMARK, METHOD AND APPARATUS FOR GENERATING SAME, AND METHOD AND APPARATUS FOR AUTHENTICATING SAME

(71) Applicant: I-SPRINT INNOVATIONS PTE LTD, Singapore (SG)

(72) Inventors: Chin Phek Ong, Singapore (SG); Wai Keung Ching, Singapore (SG); Tat Kwong Simon Leung, Singapore (SG)

(73) Assignee: I-SPRINT INNOVATIONS PTE LTD, Singapore (SG)

( * ) Notice: Subject to any disclaimer, the term of this patent is extended or adjusted under 35 U.S.C. 154(b) by 250 days.

(21) Appl. No.: 17/867,076

(22) Filed: Jul. 18, 2022

(65) Prior Publication Data

US 2023/0050492 A1 Feb. 16, 2023

(51) Int. Cl.
*H04L 9/32* (2006.01)
*H04L 9/00* (2022.01)
*H04L 9/06* (2006.01)
*H04L 9/08* (2006.01)
*G06K 19/06* (2006.01)

(52) U.S. Cl.
CPC ......... *H04L 9/0869* (2013.01); *H04L 9/0643* (2013.01); *H04L 9/0894* (2013.01); *H04L 9/3236* (2013.01); *G06K 19/06037* (2013.01)

(58) Field of Classification Search
CPC ............... H04L 9/0869; H04L 9/3236; G06K 19/06037
USPC .......................................................... 713/176
See application file for complete search history.

(56) References Cited

U.S. PATENT DOCUMENTS

| 7,657,057 | B2 | 2/2010 | Davidson et al. | |
| 10,284,790 | B1* | 5/2019 | Morse | H04N 21/8456 |
| 10,740,613 | B1* | 8/2020 | Sinclair | G06T 1/0021 |
| 11,636,565 | B1* | 4/2023 | Evans | G06T 1/0042 |
| | | | | 382/103 |
| 2007/0114285 | A1 | 5/2007 | Chang et al. | |
| 2007/0268310 | A1* | 11/2007 | Dolph | G06T 17/05 |
| | | | | 345/629 |
| 2011/0137900 | A1* | 6/2011 | Chang | G06F 40/186 |
| | | | | 707/E17.046 |
| 2017/0046606 | A1 | 2/2017 | Hosokane | |
| 2017/0262247 | A1* | 9/2017 | Yoganandan | G06F 3/1462 |
| 2020/0275069 | A1* | 8/2020 | Tanaka | H04N 9/3185 |
| 2022/0147648 | A1* | 5/2022 | Babcock | G06F 21/6245 |
| 2022/0147970 | A1* | 5/2022 | Babcock | G06Q 20/4016 |

FOREIGN PATENT DOCUMENTS

| CN | 101482933 A | | 7/2009 | |
| CN | 113124854 A | * | 7/2021 | .......... G01C 21/005 |
| EP | 0 905 967 A1 | | 3/1999 | |
| JP | 2017-102841 A | | 6/2017 | |
| JP | 2020-086893 A | | 6/2020 | |

* cited by examiner

*Primary Examiner* — Haresh N Patel
(74) *Attorney, Agent, or Firm* — Polsinelli PC; Simon Booth

(57) ABSTRACT

The present disclosure provides a graphical watermark, a method and an apparatus for generating a graphical watermark, and a method and an apparatus for authenticating a graphical watermark. The graphical watermark includes: a plurality of graphical markers carrying position and pose information, and identity information of the graphical watermark; and a watermark pattern provided between a pair of graphical markers.

20 Claims, 13 Drawing Sheets

GRAPHICAL WATERMARK, METHOD AND APPARATUS FOR GENERATING SAME, AND METHOD AND APPARATUS FOR AUTHENTICATING SAME

CROSS REFERENCE TO RELATED APPLICATION

The present application is based on and claims priority to Singapore Patent Disclosure with No. 10202108827Q and filed on Aug. 12, 2021, the content of which is expressly incorporated herein by reference in its entirety.

TECHNICAL FIELD

The present disclosure relates to the field of graphical watermark technology, and more particularly to a graphical watermark, a method and an apparatus for generating a graphical watermark, and a method and an apparatus for authenticating a graphical watermark.

BACKGROUND

A graphical code, such as the Quick Response (QR) code and the barcode, is one of the most popular coding methods on mobile devices in recent years, which can carry more information and represent more data types. In order to protect against counterfeiters or as a deterrence, a graphical watermark is usually embedded into the graphical codes. When the original graphical code including the graphical watermark is replicated, for example by scanning and printing or by taking a photograph, watermark data is modified and different from the original data used for generating the graphical watermark. A watermark pattern in the graphical watermark is positioned in a region bounded by graphical markers. Since the original graphical watermark has a higher similarity or correlation score than the replicated graphical watermark, in order to compare the similarity or correlation score using a camera device, the graphical watermark captured by the camera needs to be corrected for perspective distortion, such as translation, rotation, scaling and camera tilt.

However, when the graphical watermark is applied onto a cylinder surface, such as a wine bottle, a known 3D model of the cylinder is required such as the physical size of the curvature. It is no longer sufficient to only use the perspective correction, because the curvature of the bottle introduces additional geometric deformation that need to be corrected. In addition, if the geometric correction is performed on an cylinder surface without knowing the cylinder size or camera parameters, much more markers are required because of more unknown parameters. Therefore, the geometric distortion introduced by the cylinder surface is more significant when scanning at an angle which is not parallel, which results in a significant drop in the similarity or correlation score, produces high false negative results and causes unreliable authentication results.

SUMMARY

One of technical problems addressed by the present disclosure is to provide a graphical watermark, a method and an apparatus for generating a graphical watermark, and a method and an apparatus for authenticating a graphical watermark.

According to an embodiment in one aspect of the present disclosure, a graphical watermark is provided, including: a plurality of graphical markers carrying position and pose information, and identity information of the graphical watermark; and a watermark pattern provided between a pair of graphical markers.

According to an embodiment in another aspect of the present disclosure, a method for generating a graphical watermark is provided, including:
generating a plurality of graphical markers carrying position and pose information, and identity information of the graphical watermark;
generating a watermark pattern and providing the watermark pattern between the pair of graphical markers to form the graphical watermark.

According to an embodiment in another aspect of the present disclosure, a method for authenticating a graphical watermark is provided, including:
acquiring identity information of a graphical watermark by scanning the graphical watermark;
constructing a watermark reference according to the identity information;
detecting a plurality of graphical markers of the graphical watermark, acquiring position and pose information of each graphical marker;
pairing up the detected graphical markers according to the position and pose information of each graphical marker, and computing a similarity or correlation score of a watermark pattern bounded by a pair of graphical markers according to the watermark reference; and
determining whether the graphical watermark is authentic according to the similarity or correlation score.

According to an embodiment in another aspect of the present disclosure, an apparatus for generating a graphical watermark is provided, including:
a generation module configured to: generate a plurality of graphical markers carrying position and pose information, and identity information of the graphical watermark; generate a watermark pattern, and provide the watermark pattern between the pair of graphical markers to form the graphical watermark.

According to an embodiment in another aspect of the present disclosure, an apparatus for authenticating a graphical watermark is provided, including:
an acquisition module configured to acquire identity information of a graphical watermark by scanning the graphical watermark;
a construction module configured to construct a watermark reference according to the identity information;
a detection module configured to detect a plurality of graphical markers of the graphical watermark and acquire position and pose information of each graphical marker;
a computation module configured to pair up the detected graphical markers according to the position and pose information of each graphical marker, and compute a similarity or correlation score of a watermark pattern bounded by a pair of graphical markers according to the watermark reference; and
a determination module configured to determine whether the graphical watermark is authentic according to the similarity or correlation score.

BRIEF DESCRIPTION OF THE DRAWINGS

Other features, objectives, and advantages of the present disclosure will become clearer by reading the following detailed description of non-limiting embodiments with reference to the accompanying drawings.

Figure 1:
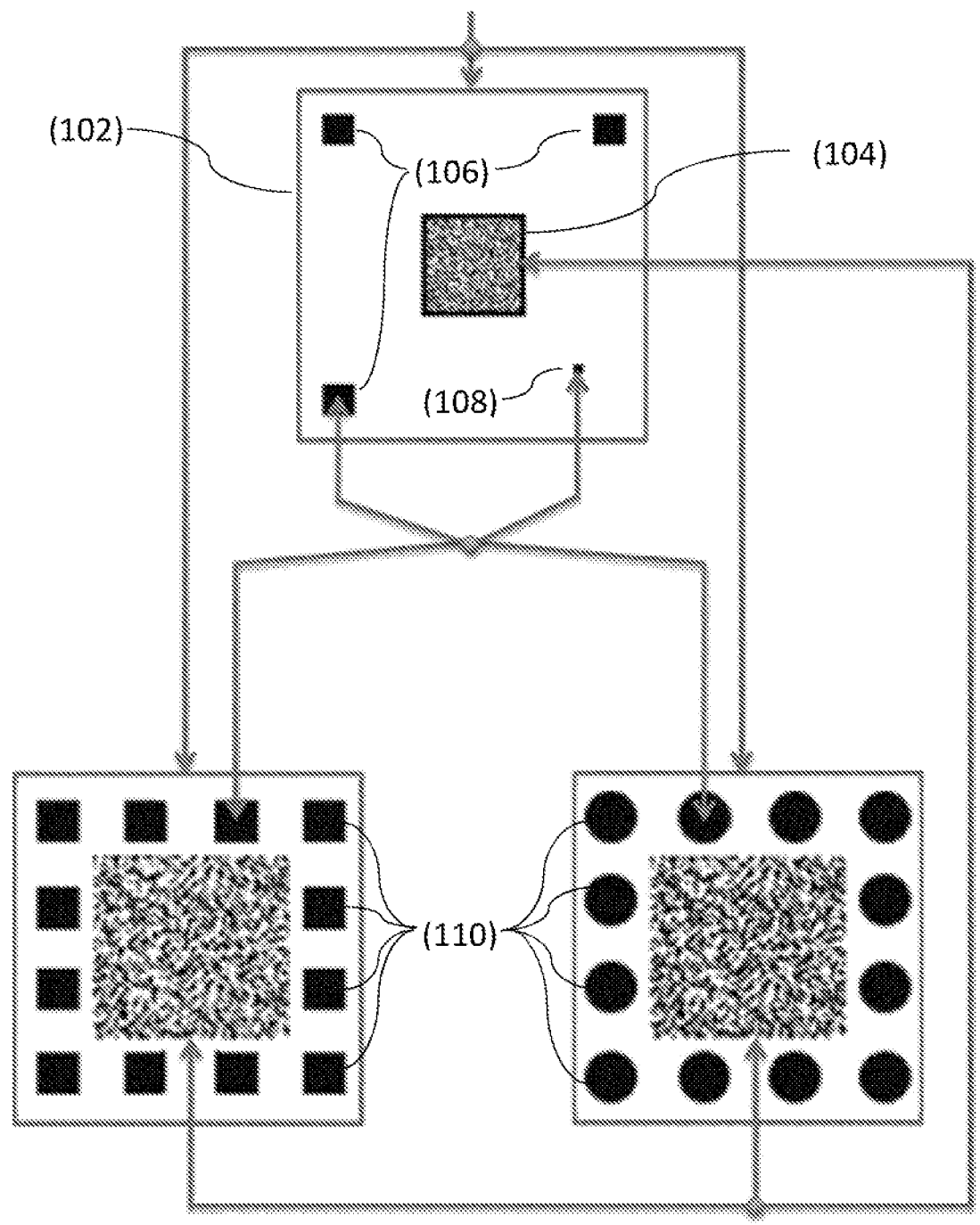
FIG. 1 is a schematic structure diagram of a graphical watermark.

It will be appreciated by those of ordinary skill in the art that the following detailed description will be provided with reference to the illustrated embodiments and drawings, the present disclosure is not limited to these embodiments. Rather, the scope of the present disclosure is broad and is intended to be only limited by the appended claims.

DETAILED DESCRIPTION OF THE EMBODIMENTS

Before detailing the exemplary embodiments, it should be noted that some exemplary embodiments are described as processes or methods depicted as flowcharts. Although various operation steps in the flowcharts are described as being processed sequentially, many of these operation steps can be performed in parallel, concurrently, or simultaneously. In addition, the order of the operation steps can be rearranged. The process can be terminated when its operation is complete, and can also include additional steps not shown in the drawings. The process may correspond to a method, a function, a procedure, a subroutine, a subprogram, etc.

The method provided by the present disclosure is implemented on a computer device including a user device and a network device. The user device includes, but is not limited to, a computer, a smartphone, a personal digital assistant (PDA), and the like. The network device includes, but is not limited to, a single network server, a server group consisting of multiple network servers, or a cloud consisting of a large number of computers or network servers based on Cloud Computing. The computer device can operate alone to implement the present disclosure, or can access the network and implement the present disclosure by interacting with other computer devices on the network. The network on which the computer device is located includes, but is not limited to, the Internet, a wide area network (WAN), a metropolitan area network (MAN), a local area network (LAN), a virtual private network (VPN) network, and the like.

It should be noted that the user device, network device, networks, and the like are merely examples, and other existing or possible future computer devices or networks which may be applicable to the present disclosure, are also included within the scope of the present disclosure and are incorporated herein by reference.

The methods discussed below, some of which are shown by the flowcharts, can be implemented by hardware, software, firmware, middleware, microcode, a hardware description language, or any combination thereof. When the methods are implemented in software, firmware, middleware, or microcode, program codes or code segments used for performing the necessary tasks can be stored in a machine or a computer-readable medium, such as a storage medium. One or more processors can perform the necessary tasks.

The specific structural and functional details disclosed herein are representative only and are for the purpose of describing exemplary embodiments of the present disclosure. The present disclosure can, however, be implemented in many alternative forms and should not be construed as limited only to the embodiments set forth herein.

It is to be understood that although the terms "first," "second," and the like are used here to describe individual elements, these elements should not be limited by these terms. These terms are used merely for distinguishing one unit from another. For example, the first unit can be referred to as the second unit, and similarly the second unit can be referred to as the first unit, without departing from the scope of the exemplary embodiments. The term "and/or" used here includes any and all combinations of one or more of the listed associated items.

It should be understood that when one unit is referred to as "connected" or "coupled" to another unit, it may be directly connected or coupled to the other unit, or there may be an intermediate unit. Correspondingly, when one unit is referred to as "directly connected" or "directly coupled" to another unit, there is no intermediate unit. Other words (e.g., "located between" versus "directly located between", "adjacent to" versus "directly adjacent to", etc.) used for describing the relationship between units should be interpreted similarly.

The terms used here are for the purpose of describing specific embodiments only and is not intended to limit the exemplary embodiments. Unless the context clearly indicates otherwise, the singular forms "a," "an," and "an item" are also intended to include the plural. It should also be understood that the terms "comprising" and/or "including" as used here specifies the presence of stated features, integers, steps, operations, units, and/or components, without excluding the presence or addition of one or more other features, integers, steps, operations, units, components, and/or combinations thereof.

It should also be mentioned that in some alternative embodiments, the mentioned functions/actions may take place in an order different from that indicated in the drawings. For example, two diagrams shown in succession may actually be executed substantially simultaneously or may sometimes be executed in a reverse order, depending on the function/action involved.

The present disclosure will be described in further detail below based on embodiments with reference to the accompanying drawings.

In an embodiment, a printed graphical watermark technique as shown in the document WO 03/098540 A1 operates in the spatial domain; and the printed graphical watermark technique shown in the document U.S. Pat. No. 10,140,563 B2 operates in the frequency domain. Both these techniques can embed watermark into other types of graphical codes that carries information such as barcode or QR code. When an original code containing a graphical watermark is replicated, for example by scanning and printing or by taking a photograph and printing, watermark data is modified, and differentiation from the original code can be achieved by comparing the similarity or correlation with the original digital data used for generating the graphical watermark. The original code will have a higher similarity or correlation score than the replica. A threshold can be utilized to make a determination, so that when the similarity or correlation score is higher than the threshold, the printed code is considered as genuine. Such technology is useful for protection against counterfeiters or as a deterrence, when a code is printed on product packaging, or on stickers applied to packaging. Consumers can then perform authenticity checking of a product when equipped with suitable mobile camera devices. Such checking can be performed before purchase, as opposed to hidden codes authentication, where the consumer has to purchase the product before they are allowed to access the hidden code for authentication.

In an embodiment, a watermark pattern bounded by a pair of graphical markers can be static, which means it is the same for all printed code. Alternatively, the watermark pattern can be different for each unique code. One way to achieve this is to generate the graphical watermark by using message-based keys as described in the document WO 03/098540 A1. Hybrids of static and variable watermark can be used concurrently, for example, the same graphical watermark is used for all prints in one batch, but different graphical watermarks are used for different batches.

In an embodiment, in order to compare the similarity or correlation score using a camera device, the graphical watermark as captured by the camera needs to be corrected for perspective distortion, which may include translation, rotation, scaling, and camera tilt. Such correction requires the use of graphical markers. A minimum of four points is required to perform the perspective correction. As described in the document U.S. Pat. No. 10,140,563 B2, the position and alignment markers of a QR code are used for the perspective correction of the graphical watermark. In addition, as described in the document WO 03/098540 A1, a black border surrounding the graphical watermark is used. Four corners of the black border are used for the perspective correction.

The precision of the graphical markers used for the projective correction is very important for the accuracy of the similarity or correlation score. A slight misalignment in the detection of the position of the graphical marker may cause significant degradation of the similarity or correlation score. This is because in order to have strong defenses against counterfeiters, the graphical watermark need to be very small such that it is not easy to replicate. As described in the document U.S. Pat. No. 9,594,993 B2, the size of each pixel of the graphical watermark is preferably notably from 30 to 50 micron. The position information in QR code or barcode might not be sufficient for the level of accuracy required. There exists known techniques to improve the precision of computation of the similarity or correlation score. A drawing from EP 3,242,239 A1 is shown in FIG. 1. The graphical watermark 102 includes QR code markers 106, 108 as the primary markers. In order to achieve better accuracy in perspective correction, additional secondary markers 110 are added, which are smaller in size and placed closer to the graphical watermark 104 to assists in the perspective correction. A smaller size improves the precision of the detection of the marker and closer proximity reduces positional error. In addition, in the document EP 3,242,239 A1, more than four secondary markers 110 are utilized such that it is possible to compute the similarity or correlation score by using a sub-region bounded by a subset of four markers among all the markers. Such manner also allows for computation to continue if some markers are damaged.

Figure 2:
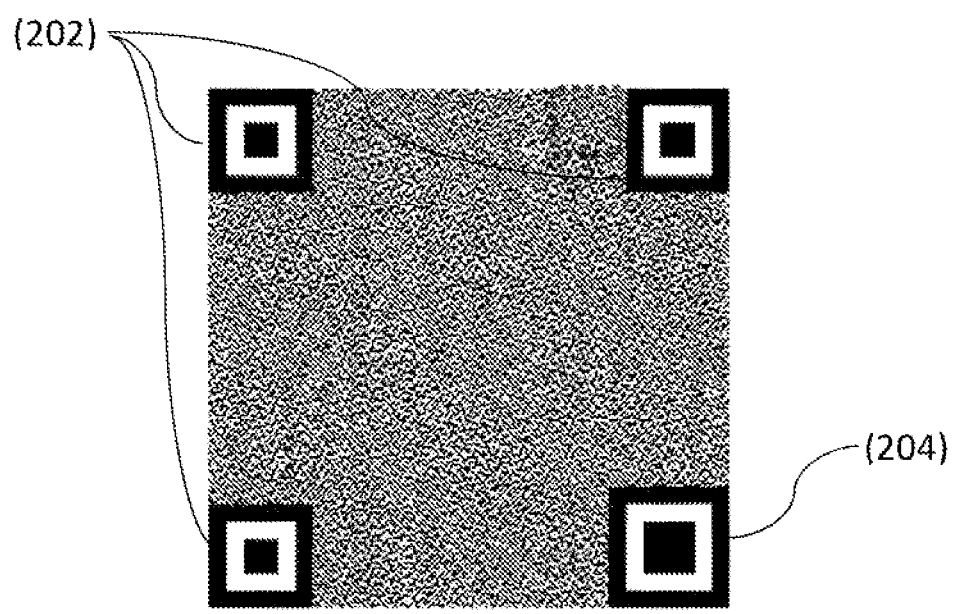
FIG. 2 is a schematic structure diagram of a graphical watermark.

In addition to the position information, it is necessary to know the orientation of the watermark. A minimum of four points of position markers can result in four possible orientations even if the four position markers are preprocessed to assume a rectangular bounding box, by eliminating other configurations such as two triangles connecting at the tip. In the document EP 3,242,239 A1, the orientation information is obtained from the alignment marker of the QR code, where one of the corners has a marker 108 which is smaller than the other three markers 106. The detection of this special marker is important as the other secondary markers make use of the relative positions from this special marker to infer the position and orientation of the special marker with respect to the other secondary markers. It is possible to perform a brute force computation of all the possible orientations of the watermark and use the highest score, but this would slow down the processing and reduce the framerate. In an embodiment as described in the document U.S. Pat. No. 10,185,907 B2, one of the corners has a marker 204 which is larger than the other three markers 202, as shown in FIG. 2. In this embodiment, the watermark pattern is positioned in the region bounded by these four markers.

In the practical disclosure, when the graphical watermark is applied onto a cylinder surface, such as a wine bottle, it is no longer sufficient to use the perspective correction alone. This is because the curvature of the bottle introduces additional geometric deformations that needs to be corrected. Typically for codes such as a barcode, a QR code, or other forms of graphical codes, such geometric deformations do not impact the reading even when only perspective correction is applied and cylinder geometric correction is ignored. This is because the curvature of the bottle is small relative to the size of the graphical data element used. However, it is found that the curvature of the bottle is relatively significant to the reading of the watermark as each data element of the watermark is around 40 microns when 600 dots per inch printing is used. In addition, this small size can achieve strong protection again counterfeiters. Smaller watermark element size can be used for stronger protection against counterfeiters, such as 1200 or 2400 dots per inch resolution. It is found through experiments that watermark verification is only successful when a user scans the code at a position relatively parallel to the surface of the watermark.

The geometric distortion introduced by the cylinder surface is more significant when scanning at an angle which is not parallel, which can result in a significant drop in the similarity or correlation score, and produce high false negative results.

In an embodiment as described in the document U.S. Pat. No. 6,814,291 B1, a technique for correcting geometric distortion is provided. Specifically, a group of four adjacent blocks sharing a common corner is used as an internal landmark to determine the global geometry of a barcode and to reverse the distortion on a mail that may be distorted. This technique can handle more generic geometric distortions than a cylinder surface. However, it is not usable for watermark data because of the small size of the watermark. A square pixel in the digital format of the watermark might produce a rounded dot with random and uncontrollable smear when printed. A group of four pixels might smear together if the ink forms a blob of an unstructured shape rather than the square-like nature of barcodes.

In another embodiment, additional markers used as described in the document EP 3,242,239 A1 can be combined with the teachings in the document U.S. Pat. No. 6,814,291, such that additional markers are added to the watermark to recover the cylindrical geometry of the watermark. A three-dimensional model of a cylinder can be created with three-dimensional points of all the markers. The three-dimensional points are then projected to a 2D surface by using a camera projection matrix. In this way, the geometric distortion can be corrected and the similarity or correlation score can be computed accurately, and thus the authenticity can be decided accurately. However, this requires a known 3D model of the cylinder such as the physical size of the curvature. Accordingly, this technique cannot be applied to a cylinder of unknown size. Another issue with such technique is that different camera have different camera projection matrix. Accordingly, this technique cannot be applied to all cameras. It is difficult to map all 3D models to 2D surface in the real physical world. For example, the lens distortion is not modeled. Such missing parameter affects the accuracy of the geometric correction, especially when the watermark element is about 40 microns or smaller in size. It is found through experiments that such technique produces very high false negative rate, causing unreliable authentication results.

FIG. 1 is a schematic structure diagram of a graphical watermark 102 according to an embodiment. In this embodiment, the graphical watermark 102 includes a watermark 104, a plurality of primary markers and a plurality of secondary markers 110. Specifically, the plurality of primary markers include QR code markers 106 and 108; each of the second markers is smaller in size and placed adjacent to the watermark 104 to assist in perspective correction.

In this embodiment, positional information of the watermark 104 is encoded in the QR code, orientation information of the watermark 104 is obtained from an alignment marker of the QR code. The secondary markers in the smaller size can improve the precision of the detection of the markers, and closer proximity can reduce a positional error. In the embodiment, more than four secondary markers 110 are adopted such that it could be possible to compute the similarity or correlation score using a sub-area bounded by a subset of four markers among all the markers, and also allows the computation to continue if some markers are damaged. In this embodiment, the QR code marker 108 is smaller than the other three markers 106. In such arrangement, it could be possible to perform a brute force computation of all the possible orientation of the watermark and use the highest score, but it would slow down the processing and reduce the framerate.

FIG. 2 is a schematic structure diagram of a graphical watermark according to an embodiment. In this embodiment, a physical watermark includes four graphical markers and a watermark pattern positioned in an area bounded by the four graphical markers (201, 202, 203, 204). The graphical markers (201, 202, 203) have the same size, while the graphical marker 204 is larger in size than the other three graphical markers.

However, when the graphical watermarks provided in the above-mentioned embodiments are applied onto a cylinder surface, such as a wine bottle, it is no longer sufficient to use a perspective correction alone, because the curvature of the bottle introduces additional geometric deformations that need to be corrected. It can be understood that the geometric deformations do not impact the reading of the codes such as barcode, QR code or other forms of graphical codes, but can significantly impact the reading of the watermark.

Figure 3:
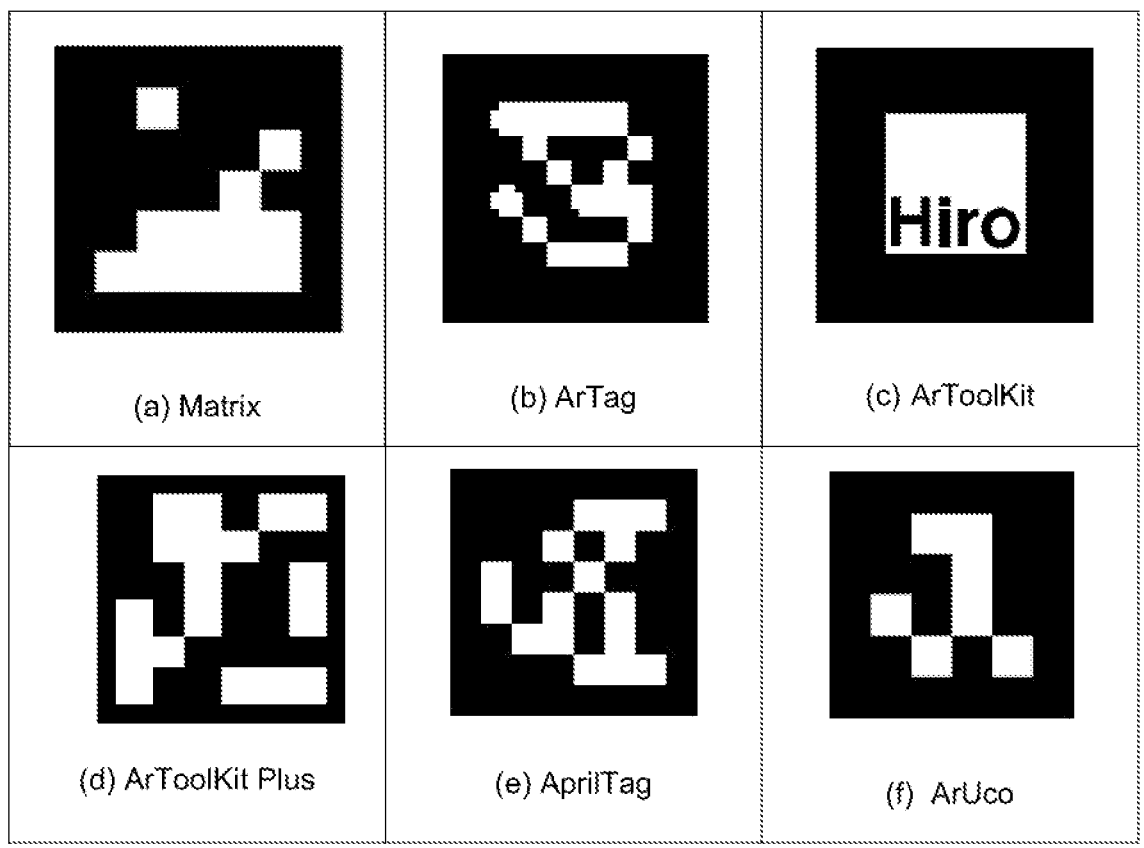
FIG. 3 is a schematic structure diagram of graphical markers.

FIG. 3 is a schematic structure diagram of graphical markers. This embodiment provides some graphical markers, which are merely exemplary, not intended to understand as limiting the scope of the present disclosure.

In this embodiment, each of the graphical markers carries position information and pose information. These graphical markers appear similar in appearance, each having a black surrounding border, followed by white spaces around this black border. They differ from each other mainly by their detection algorithm. Inside the black border are various smaller black and white blocks which contains binary information, for example white block is "1" and black block is "0" or vice versa. These binary information gives each block an identity. Usually a dictionary of blocks is used, with each block having a unique identity. The position of four corners of the outer border are detected by the respective algorithm to provide pose information.

There exist other variants of these graphical markers which does not look like a square. However, these variants can still provide the position information and pose information required by the present disclosure to robustly compute the watermark similarity or correlation score. For example, the conventional graphical markers are mainly for the disclosure of augmented reality both in a printed form and digital form, and users can scan the digital marker to see the augmented reality model. The use of such markers in the present disclosure is different from that in the general disclosure area. The markers used in the present disclosure is for the purpose of authenticity verification of physical products. User should scan a printed version of the marker. Accordingly, a size of the marker used in the present disclosure is significantly different from the conventional marker. Specifically, for augmented reality, the markers are relatively larger at between 1 cm and 10 cm such that they are highly visible in the camera and the augmented reality models rendered on top of them are sufficient big and clear to the user. However, in the present disclosure, a preferred size used in the present disclosure is around 500 microns to 3000 microns. Even more preferably, the graphical marker in the present disclosure is around 1000 microns to 2000, which is 10 times smaller than the size typically used. In addition, in the present disclosure, an operation can be performed by only using a pair of markers; whereas the conventional marker can function independently.

Figure 4:
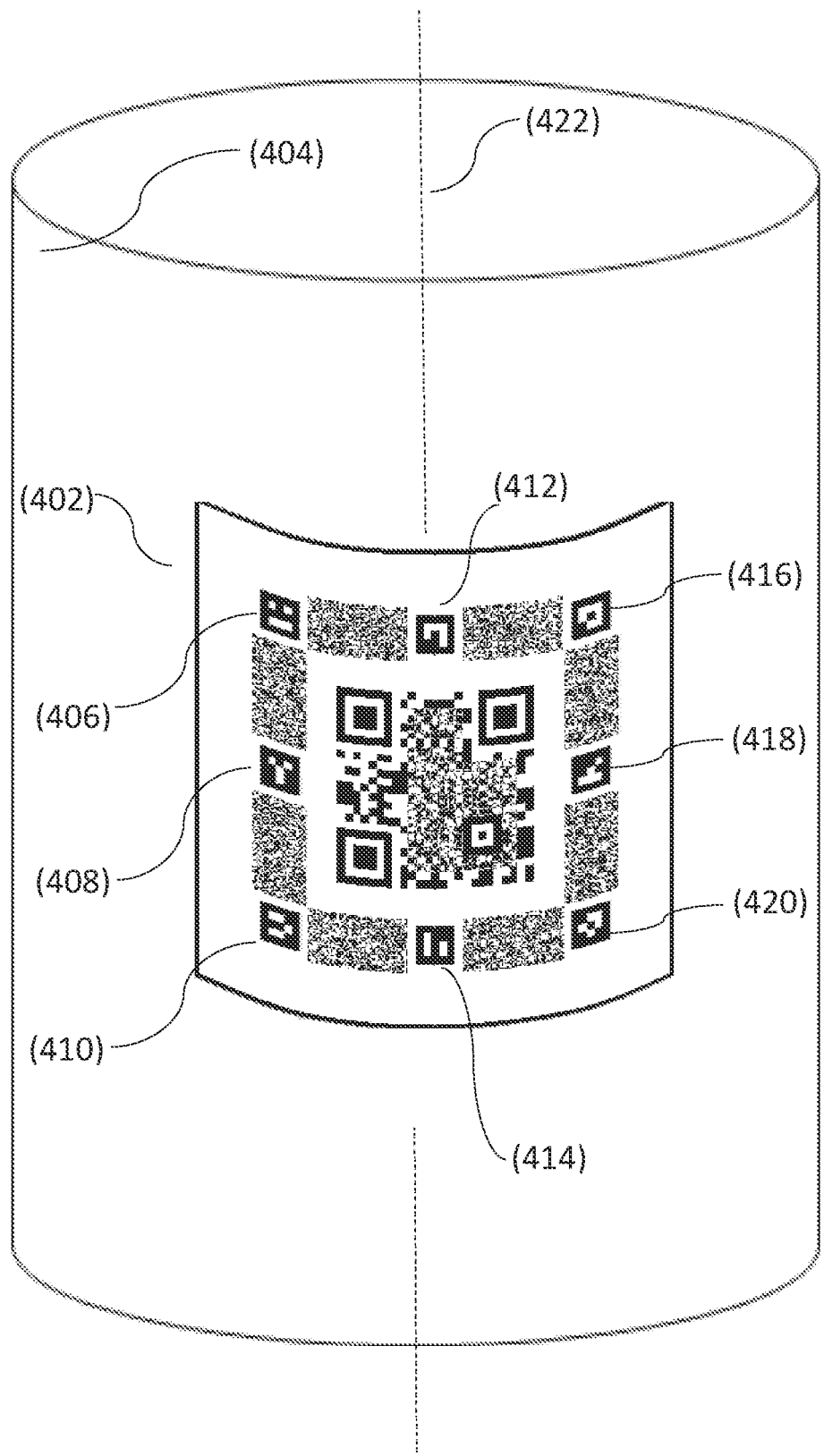
FIG. 4 is a schematic structure diagram of a graphical watermark which is applied on a cylinder according to an embodiment of the present disclosure.

In order to improve the graphical watermark, the present disclosure further provides a graphical watermark in an embodiment as shown in FIG. 4.

FIG. 4 is a schematic structure diagram of a graphical watermark 402 which is applied on a surface of a cylinder according to an embodiment of the present disclosure. The graphic watermark 402 includes a Quick Response (QR) code and a watermark, and the watermark is embedded in the QR code. The graphical watermark includes a plurality of graphical markers and a watermark pattern, and the watermark pattern is provided between a pair of graphical markers.

Specifically, as shown in FIG. 4, identity information of the graphical watermark is encoded into a Uniform Resource Locator (URL) of the QR code; the watermark includes eight graphical markers, namely graphical markers (406, 408, 410, 412, 414, 416, 418, 420) consisting of different black and white blocks internally. The graphical markers appear similar in appearance, and each graphical marker has a black surrounding border, followed by white spaces around the black border. Inside the black border are various smaller black and white blocks which contain binary information, for example, white is 1 and black is 0 or vice versa. The binary information provides each block identity information. Each graphical marker does not have a rotation symmetry, i.e., one graphical marker looks different from other markers even when it is rotated. Accordingly, each graphical marker can be uniquely identified, and a pose and an orientation thereof can be determined without ambiguity. In an embodiment, each graphical marker can include position information and pose information. The position information is configured to indicate a relative position of the graphical marker in the graphical watermark; and the pose information is configured to indicate an orientation of the graphical marker in the graphical watermark. In the present embodiment, the graphical watermark includes a plurality of watermark patterns, and each watermark pattern is provided between a pair of graphical markers, such as a watermark pattern between a pair of graphical markers 406 and 408, a watermark pattern between a pair of graphical markers 408 and 410, a watermark pattern between a pair of graphical markers 412 and 414, a watermark pattern between a pair of graphical markers 416 and 418, and a watermark pattern between a pair of graphical markers 418 and 420. Furthermore, a line between two graphical markers in an axial direction of the cylinder is parallel to an axis of the cylinder. In another embodiment, when the cylinder is rotated by 90 degrees, the graphical watermark can includes a watermark pattern between a pair of graphical markers 406 and 412, a watermark pattern between a pair of graphical markers 412 and 416, a watermark pattern between a pair of graphical markers 408 and 418, a watermark pattern between a pair of graphical markers 410 and 414, and a watermark pattern between a pair of graphical markers 414 and 420.

It should be noted that the graphical watermark referred to in the present disclosure is not limited to the above embodiment, as long as the graphical watermark includes a plurality of graphical markers and a watermark pattern provided between a pair of graphical markers. Since a line between two graphical markers in an axial direction of the cylinder is parallel to an axis of the cylinder, such arrangement provides the most robust verification for the authenticity of the watermark on the cylinder surface, and accordingly, the effect of the geometric distortion introduced by the cylinder surface is eliminated when scanning at an angle which is not parallel, and a significant drop in the similarity or correlation score, high false negative results and unreliable authentication results are avoided.

Figure 5A:
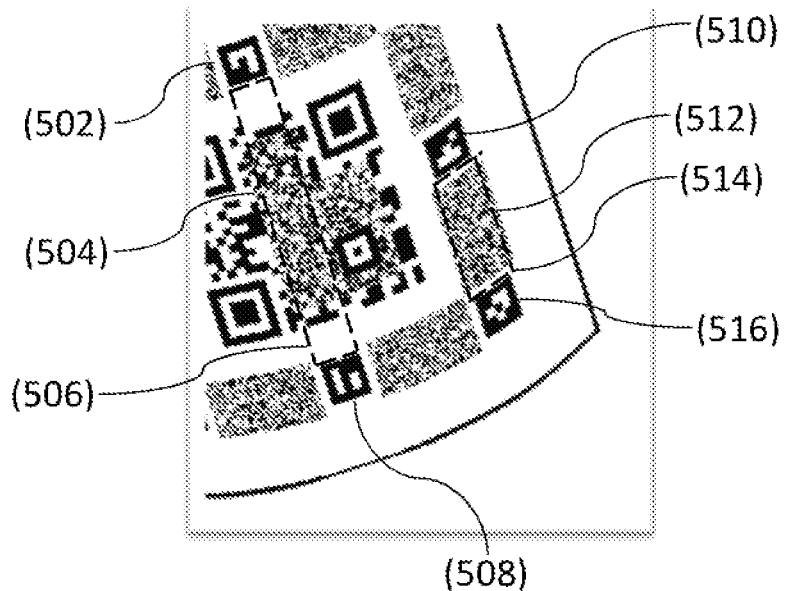
FIG. 5A is an image of a part of a graphical watermark captured by a camera according to an embodiment of the present disclosure.

FIG. 5A is an image of a part of a graphical watermark captured by a camera according to an embodiment of the present disclosure. Due to the zoom, the field of view of the camera might not cover the entire graphical watermark. As such, the QR code may no longer be detectable due to some missing portion. Further, not all graphical markers can be detected by the camera. In an example as shown in FIG. 5A, only markers (502), (508), (510), (516) are visible. In some cases, due to the distortion of the surface, such as curvature of the cylinder and the angle that the user is holding the camera, some graphical markers might be severely distorted such that even if the graphical markers are visible, they is no longer detectable.

Figure 5B:
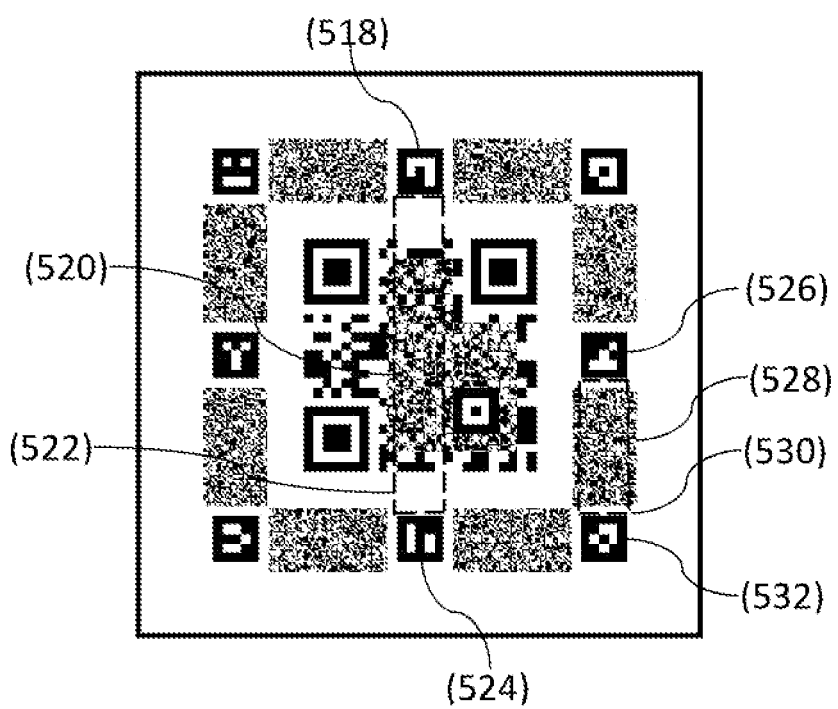
FIG. 5B is a schematic structure diagram of a watermark reference corresponding to the graphical watermark of FIG. 5A according to another embodiment of the present disclosure.

FIG. 5B is a schematic structure diagram of a watermark reference corresponding to the graphical watermark of FIG. 5A according to another embodiment of the present disclosure. In this embodiment, the marker (502) of FIG. 5A detected by the camera can be uniquely mapped to a marker (518) in a watermark reference shown in FIG. 5B. The watermark reference can be stored securely on the server; or in a preferred way, a secret key can be utilized to generate the watermark reference and the secret key is stored in the server instead. The watermark reference is then reconstructed by using the secret key. The graphical markers (508), (510), (516) in FIG. 5A detected by the camera can be mapped to markers (524), (526), (532) in the watermark reference in FIG. 5B respectively. As such the watermark pattern (504) in the sub-region (506) bounded by the graphical markers (502) and (508) can be mapped to a watermark pattern (520) in a sub-region (522) bounded by the markers (518) and (524) in the watermark reference. Similarly, the watermark pattern (512) in the sub-region (514) bounded by the graphical markers (510) and (516) in FIG. 5A can be mapped to a watermark pattern (528) in the sub-region (530) bounded by the graphical markers (526) and (532) in the watermark reference shown in FIG. 5B. The watermark reference shown in FIG. 5B functions to compute a watermark similarity or a correlation score. Specifically, a watermark similarity or correlation score is computed by comparing a watermark pattern captured in the camera to a corresponding watermark pattern in the watermark reference. For example, the watermark similarity or correlation score can be represented as a percentage of values that are the same between the perspective corrected watermark and the watermark reference. When multiple pairs of graphical markers are available, multiple watermark similarity or correlation scores of the watermark patterns are computed. A simple decision is to use the highest score and compare with a threshold of the watermark similarity or correlation score. If the highest score is higher than a threshold, the authentication is successful, and the graphical watermark is authentic; otherwise, the authentication fails.

Figure 5C:
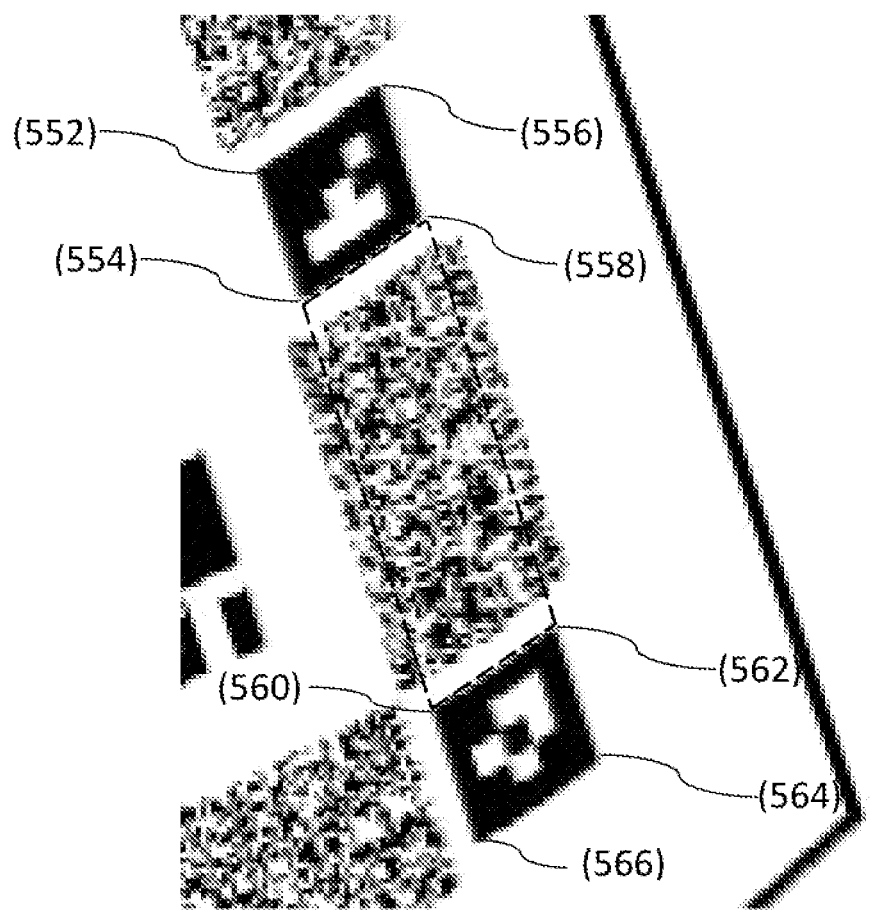
FIG. 5C is a partial enlarged view of FIG. 5A according to an embodiment of the present disclosure.

FIG. 5C is a partial enlarged view of FIG. 5B according to an embodiment of the present disclosure. For example, FIG. 5C can be regarded as a close up of FIG. 5A. The graphical marker (510) in FIG. 5A has four corners (552), (554), (556), and (558) as correspondingly shown in FIG. 5C. The graphical marker used has a property that the graphical marker does not have rotation symmetry. As such there is no orientation ambiguity of the four corners. Coordinates of the four corners can be accurately detected by various algorithms mentioned and examples of which are shown in FIG. 3. Similarly, the graphical marker (516) in FIG. 5A has four corners (560), (562), (564), and (566) as correspondingly shown in FIG. 5C. The sub-region (514) is defined by the corners (554) and (558) of the graphical marker (510) and the corners (560) and (562) of the graphical marker (516). The four corners mentioned above are configured to compute a perspective transformation matrix.

The reference of one algorithm to compute the perspective transformation matrix can be made to the document "Lepetit, V.; Moreno-Noguer, M.; Fua, P. (2009). 'EPnP: An Accurate O(n) Solution to the PnP Problem'. International Journal of Computer Vision. 81 (2): 155-166", which is not repeated herein. For example, the perspective transformation matrix is configured to correct a perspective distortion of the watermark pattern (512).

Figure 6:
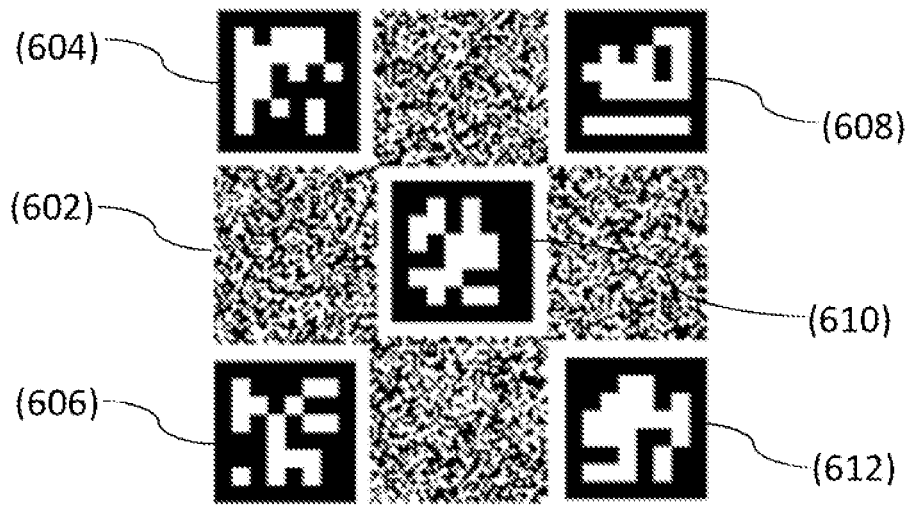
FIG. 6 is a schematic diagram of a graphical watermark without an additional code such as QR code according to an embodiment of the present disclosure.
Figure 7:
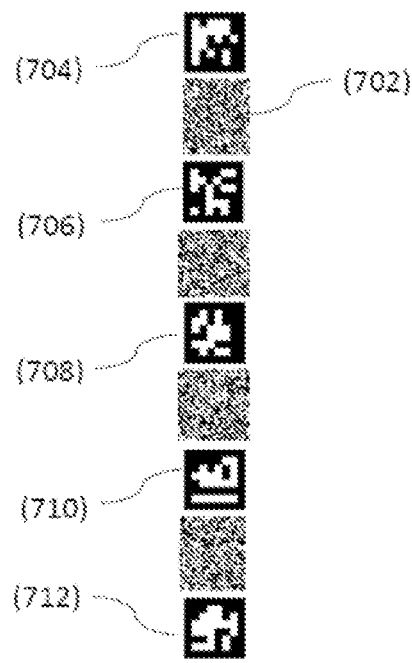
FIG. 7 is a schematic diagram of a graphical watermark without an additional code such as QR code according to another embodiment of the present disclosure.

FIG. 6 is a schematic diagram of a graphical watermark without an additional code such as QR code according to an embodiment of the present disclosure, and FIG. 7 is a schematic diagram of a graphical watermark without an additional code such as QR code according to another embodiment of the present disclosure. As shown in FIG. 6, a graphical watermark (602) includes a plurality of graphical markers (604), (606), (608), (610) and (612). In FIG. 7, the graphical watermark (702) includes a plurality of graphical markers (704), (706), (708), (710), and (712). The graphical watermark in FIG. 6 differs from that in FIG. 7 in terms of an arrangement of the graphical markers and the watermark patterns. The arrangement is such that the graphical watermark suits the surface and size of an item which it is applied to. For example, a physical size of the printed graphical watermark in FIG. 6 can be around 6 mm×6 mm, whereas the physical size of the printed graphical watermark in FIG. 7 can be around 2 mm×18 mm. These are also some other examples and it is flexible to increase or decrease the size and change the shape. For the case of using a QR code as shown in FIG. 4, the identity information of the code is encoded as the URL of the QR code. In this embodiment, the identity information is encoded into the graphical marker itself. However, graphical marker is not suitable for carrying a large quantity of data. Therefore, the identity information data has to be split and stored in a plurality of graphical markers instead. The graphical markers shown in FIGS. 6 and 7 are markers with an internal binary pattern of 6×6, whereas the markers in FIG. 4 have an internal binary pattern of 3×3. The use of a larger binary pattern allows each individual graphical marker to carry more information. The graphical markers used in the FIGS. 6 and 7 can each carry 18 bits of information whereas the one graphical marker in FIG. 4 can carry only 4 bits of information. For example, in systems that are designed for internet of things, the identity information is given to each individual object, e.g. a unique identity information for each and every item in all supermarkets. As such the total possible number of identities need to be large, for example 72 bits. Five graphical markers of 18 bits each are able to contain 72 bits of information and also contain additional 18 bits of information indicating the arrangement of the markers, e.g., whether it is in a straight line like FIG. 7 or in a square like FIG. 6. The authentication of the graphical watermark in this embodiment is performed by reading a plurality of graphical markers and combining the information in them into the identity information.

Figure 8:
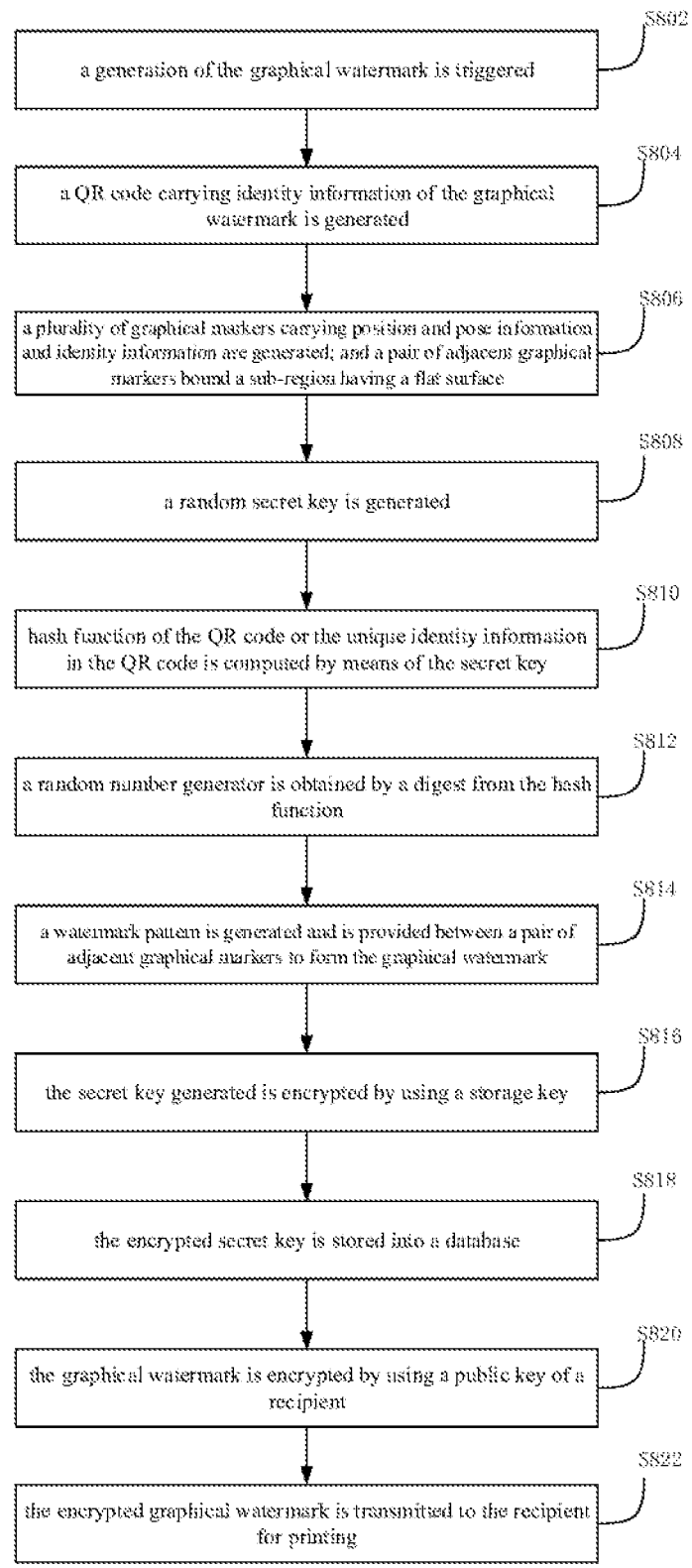
FIG. 8 is a flow chart showing a method for generating a graphical watermark according to an embodiment of the present disclosure.

In an embodiment of the present disclosure, a method for generating a graphical watermark is provided, as shown in FIG. 8. The method includes the follows steps.

At step S806, a plurality of graphical markers carrying position and pose information and identity information are generated; and a pair of adjacent graphical markers bound a sub-region having a flat surface.

Specifically, the graphical markers are positioned such that a pair of adjacent graphical markers bound a sub-region which is approximately flat. For example, in the case of a cylinder, the pair of adjacent graphical markers are positioned such that a line connecting the two adjacent graphical markers is parallel to an axis of the cylinder. The position information is configured to indicate a relative position of the graphical marker in the graphical watermark; and the pose information is configured to indicate an orientation of the graphical marker in the graphical watermark. The identity information is configured to construct the graphical watermark.

In some embodiment, since identity data of the identity information is large, the identity information can be split into several portions and each portion is embedded into one graphical marker.

At step S814, a watermark pattern is generated and is provided between a pair of adjacent graphical markers to form the graphical watermark.

Specifically, the watermark pattern is a random watermark pattern, and is generated by a random number generator. This pattern is placed between a pair of graphical markers. For example, in FIG. 4, the graphical markers 412 and 414 bound a watermark pattern in the middle of the QR code; in FIG. 5A, the graphical markers 510 and 516 bound a watermark pattern 512. The watermark pattern used can be different for each label of the products, so that the watermark pattern cannot be extrapolated from other existing labels. In an optional manner, the random watermark pattern is generated by a random number generator and is backed by a cryptographically strong key to output.

In the present embodiment, a plurality of graphical markers including position and pose information and identity information are generated; and a pair of adjacent graphical markers bound a sub-region having a flat surface; and a watermark pattern is generated and is provided between a pair of adjacent graphical markers to form the graphical watermark. In this way, a graphical watermark is generated, which can be applied to a cylinder surface, and is not affected by the curvature of the cylinder surface, accordingly there is no significant drop in the similarity or correlation score and a high false negative result is avoided, and a reliable authentication result can be obtained.

In an embodiment, before the step 806, the method for generating the graphical watermark further includes the following steps.

At step S802, a generation of the graphical watermark is triggered.

Specifically, the generation of the graphical watermark can be triggered by clicking a button in an disclosure or can be triggered automatically by a scheduled task on a server, or other manners which are not limited here.

In an optional embodiment, the method may further include the following step S804.

At step S804, a QR code carrying identity information of the graphical watermark is generated.

Specifically, the identifier can be a uniform resource locator (URL) which links to a website and also carries a unique alphanumeric identifier or base64 encoded identifier or other forms of information encoding. The QR code can be scanned with any QR code reader and the URL embedded within can be directed to. The unique identifier in the URL can then be used by the server to lookup a database of the server for corresponding product information of the item or scanning parameters such as the amount of zoom to use or the format or type of graphical watermark, etc., i.e., the identifier is configured to obtain the identity information of the graphical watermark. It could also redirect to an app installed on a mobile device or to an app store to download an app for authenticating the graphical watermark.

In an embodiment, the step S814 of generating and providing a watermark pattern between a pair of adjacent graphical markers includes the following steps.

At step S808, a random secret key is generated.

Specifically, the random secret key is generated by using a random number generator. For example, a secret key of 256 bits or 512 bits or other sizes is generated.

At step S810, a hash function of the QR code or the unique identity information in the QR code is computed by means of the secret key.

Specifically, one hash algorithm used here can be a hash-based message authentication code (HMAC). Other hash algorithms can be used, and which will not be limited herein.

At step S812, a random number generator is obtained by a digest from the hash function.

Specifically, the digest from the hash function is taken as a seed to the random number generator. One random number generator algorithm can be multiply-with-carry (MWC).

In some embodiments, after the step S814, the method may further includes the following steps.

At step S816, the secret key generated in step S808 is encrypted by using a storage key.

This step can be regarded as a storage encryption, and the data security can be ensured when the key is stored in the database. For example, One algorithm available for the storage encryption is Advanced Encryption Standard (AES).

At step S818, the encrypted secret key is stored into a database.

At step S820, the graphical watermark is encrypted by using a public key of a recipient.

At step S822, the encrypted graphical watermark is transmitted to the recipient for printing.

By the step S822, it is ensured that only the recipient can decrypt the graphical watermark for printing purposes. For example, One public key algorithm is the Rivest-Shamir-Adleman (RSA) algorithm.

In an embodiment, after the step S814, the method may further includes that the generated graphical watermark is stored in a server as a watermark reference. Optionally, a secret key for constructing the graphical watermark as the watermark reference is stored in the server.

In the above various embodiments, The above steps of the method for generating the graphical watermark can be performed in other sequences without affecting the graphical watermark generated. Further, other methods can also be used to generate a random watermark pattern which is secure.

Figure 9:
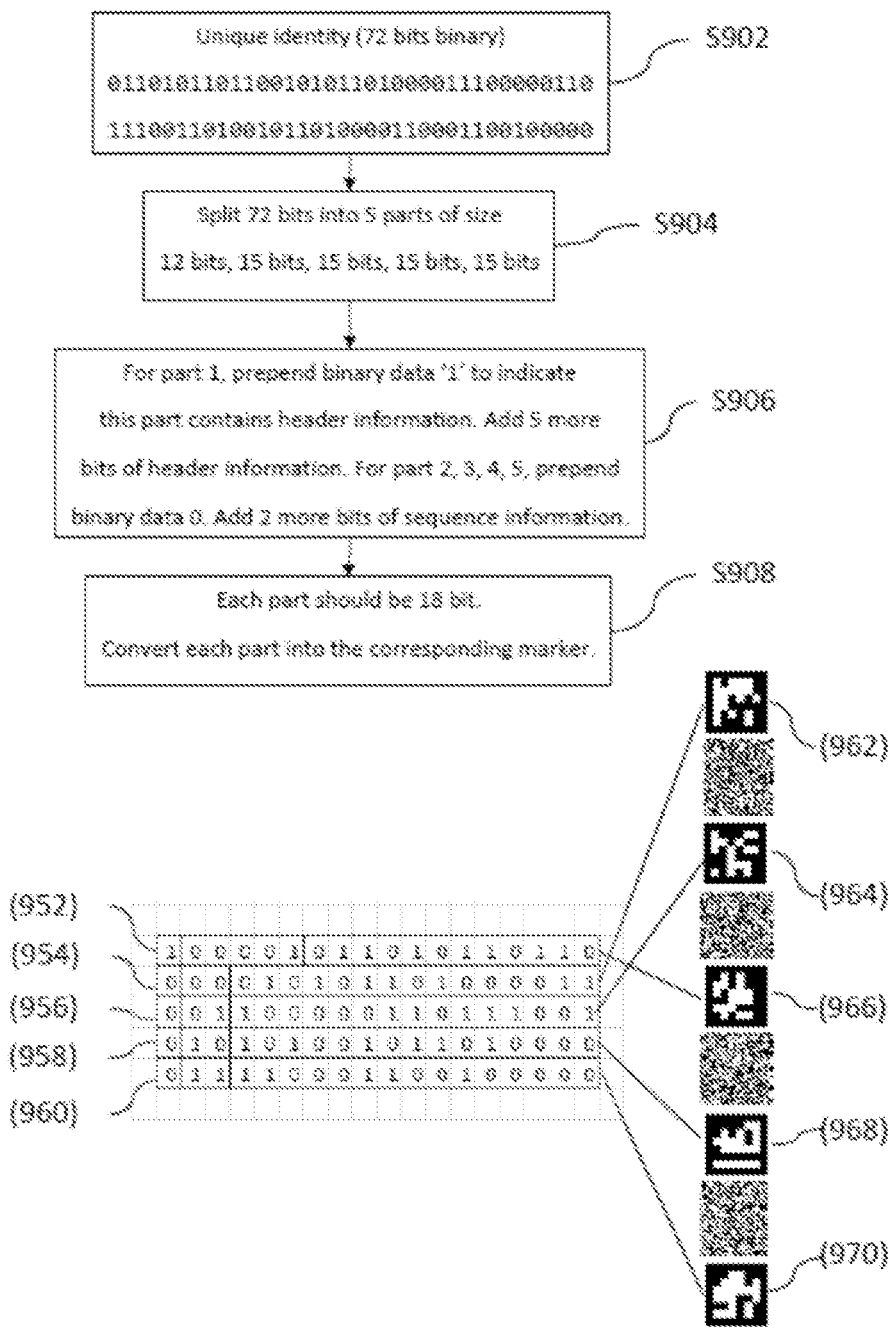
FIG. 9 shows steps to break a 72 bits identity information into five portions and encode the five portions into five graphical markers according to an embodiment of the present disclosure.

In an embodiment, as shown in FIG. 9, an example is provided to illustrate a process of splitting identity information of 72 bits into five portions and encoding the five portions into five graphical markers, and the process includes the following steps.

At step S902, a unique identity information of 72 bits is generated or obtained from the server.

For example, a product information of an item including the unique identity information is generated during the production process of the item and is uploaded to the server by an manufacturer; then the recipient can obtain the identity information from the server.

At step S904, the identity information of 72 bits is split into five portions of 12 bits, 15 bits, 15 bits, 15 bits, and 15 bits.

At step S906, additional bits are added to each portion, such that each portion has 18 bits.

For example, 1 bit with value of '1' is prepended to a first portion, followed by 5 bits of header information. Specifically, the header information contains information about the type of graphical watermark used. In this example, the header information represented by '0 0 0 0 1' indicates a graphical watermark with five graphical markers arranged in a line as shown in FIG. 7. In addition, header information represented by '0 0 0 1 0' indicates a graphical watermark with five graphical markers arrange in a square, for example, as shown in FIG. 6. The header information also indicates a total number of the portions and to combine information of all the portions together. For the other four portions, 1 bit of value '0' is prepended and followed by 2 bits of sequence information. The sequence information indicates to combine data in a right order, and also indicates during the authentication to pair up the graphical markers.

At step S908, each portion of 18 bits is converted to a corresponding graphical marker.

For example, as shown in FIG. 9, the first portion of 18 bits is denoted by 952, and is converted to a graphical marker (966). The other four portions of 18 bits (954, 956, 958, 960) are converted to graphical markers (962, 964, 968, 970). The first bit of the first portion 952 is '1' while the first bit of other four portions (954, 956, 958, 960) are '0'. In the first portion 952, the second to sixth bits are '0 0 0 0 1' to indicate the type of graphical watermark as mentioned, i.e., the graphical watermark with five graphical markers arranged in a line as shown in FIG. 7. The rest of the graphical markers (954, 956, 958, 960) has a running sequence '0 0', '0 1', '1 0', and '1 1' respectively. For cases where there are more portions, more bits are needed for the sequence. The reconstruction of the 72 bits of information is achieved by detecting the graphical markers, identifying a header graphical marker in which the first bit is '1', and reading the header information to know the watermark type and hence the total number of portions. The header graphical marker contains the first 12 bits of data. The data in other graphical markers are concatenated using the sequence information.

The above embodiment is merely an exemplary embodiment of a 72 bits of identity information. The same method can be used for identity information having more bits of information or less bits of information. For more bits of information, more portions may be required.

Figure 10:
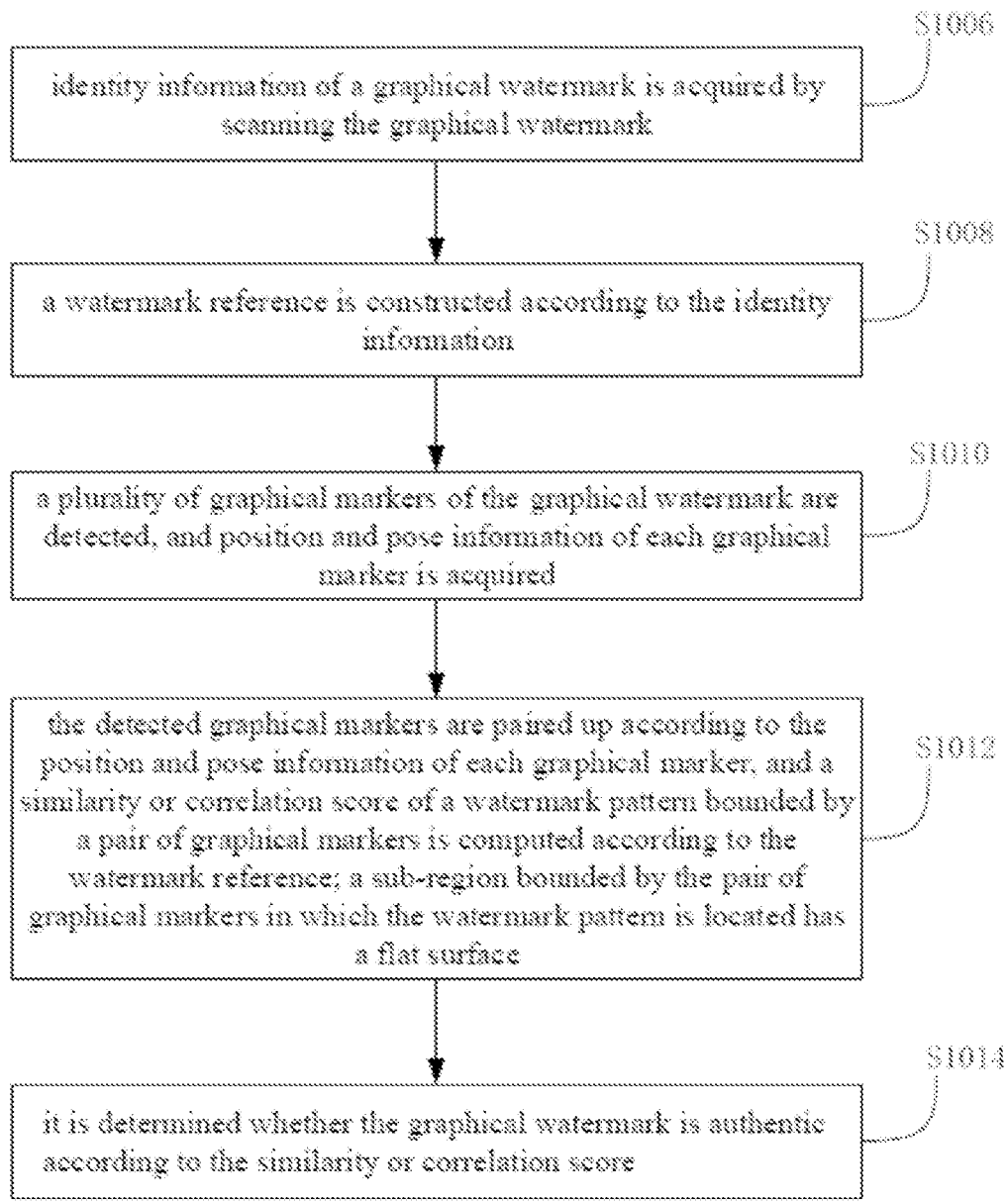
FIG. 10 is a flow chart showing a method for authenticating a graphical watermark according to an embodiment of the present disclosure.

In another embodiment, the present disclosure further provides a method for authenticating a graphical watermark, and the method includes the following steps, as shown in FIG. 10.

At step S1006, identity information of a graphical watermark is acquired by scanning the graphical watermark.

Specifically, in some embodiments, since the identity information of the graphical watermark is split and stored in a plurality of graphical markers respectively, the identity information can be acquired by combining the split identity information in the plurality graphical markers.

In some other embodiments, since the identity information is encoded into the QR code, the identity information of the graphical watermark can be acquired by scanning the QR code with an QR code reader.

At step S1008, a watermark reference is constructed according to the identity information.

Specifically, in some embodiments the watermark reference can be encrypted and stored in the database of the server, but it could consume a large amount of storage space. Preferably, the identity information corresponding to the watermark reference is stored in the database of the server, and the identity information can be acquired from the server to construct the watermark reference.

At step S1010, a plurality of graphical markers of the graphical watermark are detected, and position and pose information of each graphical marker is acquired.

At step S1012, the detected graphical markers are paired up according to the position and pose information of each graphical marker, and a similarity or correlation score of a watermark pattern bounded by a pair of graphical markers is computed according to the watermark reference; a sub-region bounded by the pair of graphical markers in which the watermark pattern is located has a flat surface.

Specifically, in an embodiment, referring to FIG. 5A, the graphical marker (502) is paired with marker (508), and graphical marker (510) is paired with the graphical marker (516). The pairing is intentional such that the watermark pattern bounded by a pair of graphical marker lies on an approximately flat sub-region of the surface. In this embodiment, a line connecting a pair of graphical markers is parallel to the axis of the cylinder. Each graphical marker has position and pose information which is configured to indicate a relative position and an orientation thereof in the graphical watermark, without needing for other graphical markers. In this embodiment, the graphical marker (502) captured by a camera can be uniquely mapped to the graphical marker (518) in the watermark reference shown in FIG. 5B. The watermark reference can be stored securely on the server; or preferably, the identity information corresponding to the watermark reference is stored in the database of the server, and the watermark reference then reconstructed by using the identity information. The graphical markers (508), (510), (516) captured by the camera shown in FIG. 5A can be mapped to the graphical markers (524), (526), (532) in the watermark reference respectively shown in FIG. 5B. As such the watermark pattern (504) in the sub-region (506) bounded by the graphical markers (502), and (508) can be mapped to the watermark pattern (520) in the sub-region (522) bounded by the graphical markers (518) and (524) in the watermark reference. Similarly, the watermark pattern (512) in the sub-region (514) bounded by the graphical markers (510) and (516) can be mapped to the watermark pattern (528) in the sub-region (530) bounded by the graphical markers (526) and (532) in the watermark reference.

At step S1014, it is determined whether the graphical watermark is authentic according to the similarity or correlation score.

Specifically, the determination can be based on a threshold of the score. When multiple pairs of graphical markers are available, multiple scores of the watermark pattern are computed. The highest score is adopted and compared to a preset threshold. Accordingly, the authentication can be successful even when the image quality of a sub-region is low, or when the sub-region is damaged. For the disclosure on a non-flat surface, such as cylinder, the authentication can be successful even when the score of the watermark pattern is lowered by geometric distortion due to the scanning angle of the camera. Therefore, the present disclosure provides a robust authentication for a printed watermark on a cylinder surface.

Figure 11:
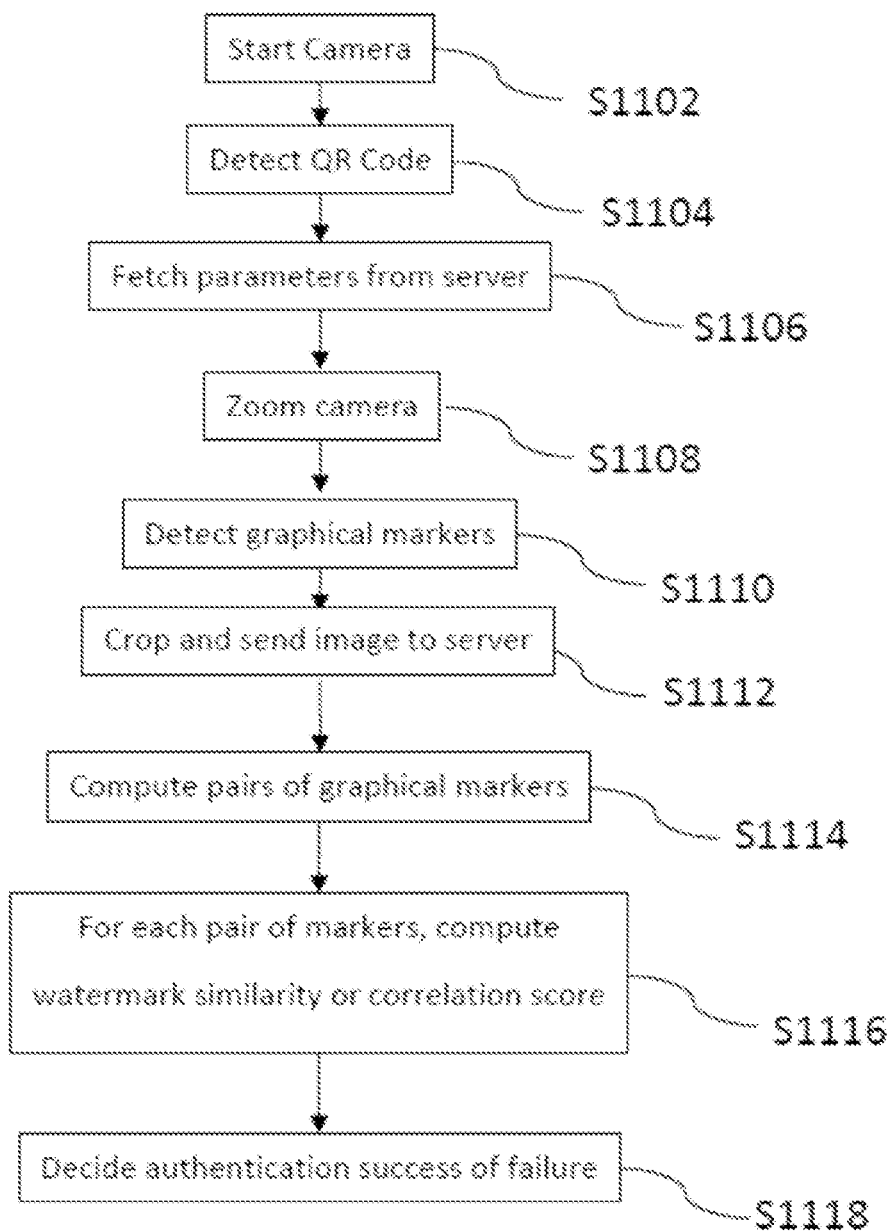
FIG. 11 is a flow chart showing a method for authenticating a graphical watermark according to another embodiment of the present disclosure.

In another embodiment of the present disclosure, an example of the method for authenticating the graphical watermark is shown in FIG. 11. This example is also explained with the reference to FIGS. 5A, 5B and 5C. The specific steps of the method is provided as follows.

At step S1102, the camera is started.

At step S1104, a QR code is detected by the camera to obtain identity information of the graphical watermark.

Specifically, in this embodiment, since the identity information of the graphical watermark is encoded into the QR code, the detection of the QR code is performed in order to obtain the identity information of the graphical watermark. The present disclosure is also suitable for disclosure on other barcodes such as a data matrix. In that case, the data matrix is detected.

At step 1106, parameters are acquired from the server according to the identity information.

Specifically, the parameters can include the amount of zoom, and position and pose information of the graphical markers. For example, after receiving a zoom value from the server, the mobile phone controls its camera to zoom to a set value, such as 250%, 150%, and so on.

At step S1108, the camera is zoomed.

At step S1110, the graphical markers are detected.

At step S1112, an image captured by the camera is cropped and sent to the server to authenticate.

Specifically, FIG. 5A shows an example of the image captured by the camera. Due to the zoom, the field of view of the camera might not cover the entire graphical watermark. As such, the QR code might no longer be detectable due to some missing portion. Also, not all graphical markers can be detected. In this example as shown in FIG. 5A, only the graphical markers (502), (508), (510), (516) are visible. In some cases, due to the distortion of the surface, such as a curvature of the cylinder and an angle at which the user holds the camera, some graphical markers might be severely distorted such that even if they are visible, they are no longer detectable.

At step S1114, the detected graphical markers are paired up.

In this example, referring to FIG. 5A, the graphical marker (502) is paired with the graphical marker (508); and the graphical marker (510) is paired with the graphical marker (516). The pairing is intentional such that the watermark pattern bounded by a pair of graphical markers lies on an approximately flat sub-region of the surface of the cylinder. In this example, a line connecting a pair of graphical markers is parallel to an axis of the cylinder. Each graphical marker has position and pose information which is configured to infer a relative position and an orientation of the graphical marker in the graphical watermark, without needing for other graphical markers. In this example, the graphical marker (502) detected by the camera can be uniquely mapped to the graphical marker (518) in the watermark reference shown in FIG. 5B. The watermark reference can be stored securely on the server; or in a preferred way, the identity information corresponding to the watermark reference is stored in the database of the server, and the watermark reference then reconstructed by using the identity information. The graphical markers (508), (510), (516) detected by the camera can be mapped to the graphical markers (524), (526), (532) in the watermark reference respectively. As such the watermark pattern (504) in the sub-region (506) bounded by the markers (502) and (508) can be mapped to the watermark pattern (520) in the sub-region (522) bounded by the graphical markers (518) and (524) in the watermark reference. Similarly, the watermark pattern (512) in the sub-region (514) bounded by the graphical markers (510) and (516) can be mapped to the watermark pattern (528) in the sub-region (530) bounded by the graphical markers (526) and (532) in the watermark reference.

At step S1116, a watermark similarity or correlation score is computed.

At step S1118, it is determined whether the graphical watermark is authentic according to the watermark similarity or correlation score.

Specifically, the determination can be based on a threshold of the watermark similarity or correlation score. When multiple pairs of markers are available, multiple scores of the watermark pattern are computed. A simple decision is to use the highest score and compare it with the threshold. As such, the authentication can be successful even when the image quality of a sub-region is low, or when the sub-region is damaged. For the disclosure on a non-flat surface, such as a surface of a cylinder, the authentication can be successful even when the score of some sub-region is lowered by geometric distortion due to the camera scanning angle.

In an embodiment of the present disclosure, the determination of whether a printed graphical watermark is authentic can be based on multiple images. Steps S1110, S1112, S1114, and S1116 can be repeated for each image captured by the camera. The determination can then be based on the highest score computed using multiple images. Since in the present disclosure graphical markers with position and pose information are used, and that the graphical markers are arranged such that a minimum of two graphical markers are sufficient to get a similarity or correlation score, and the step S1104 does not need to be executed again. Therefore, not only the computation time is reduced, but also the robustness is improved because it is able to function with a portion of the watermark visible in the camera.

Figure 12:
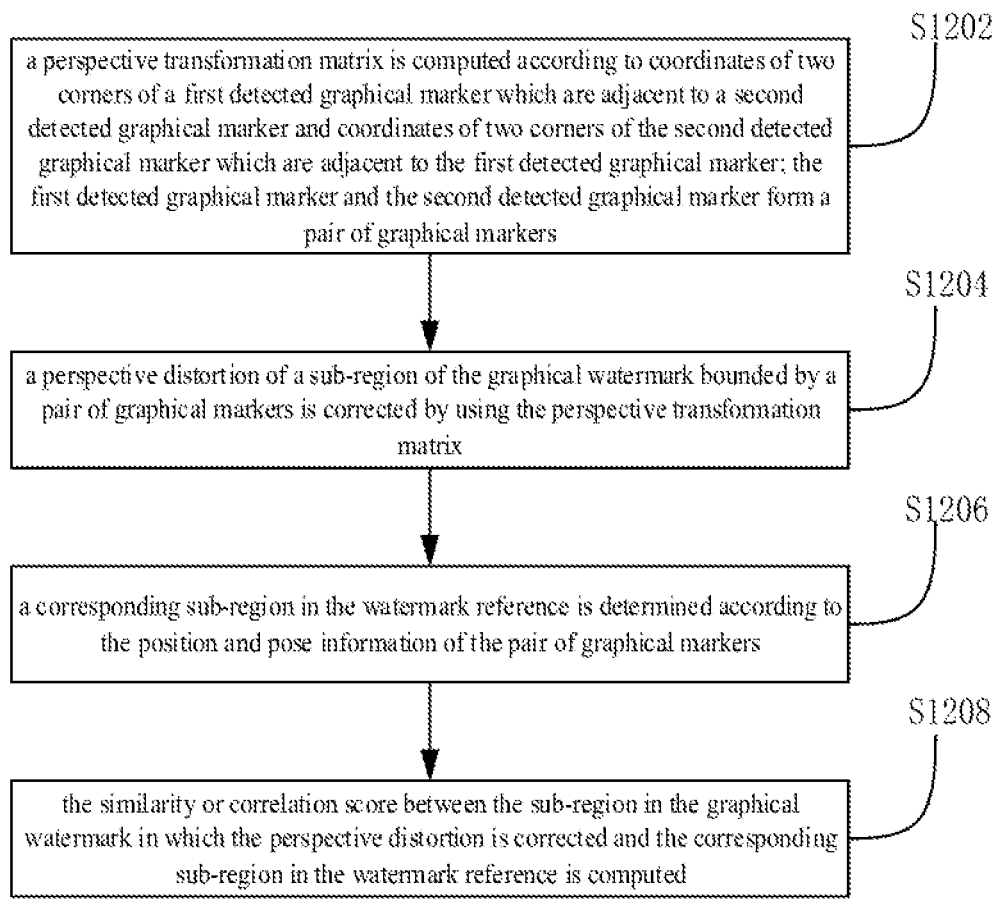
FIG. 12 is a flow chart showing a step of computing a watermark similarity or correlation score of a watermark pattern bounded by a pair of graphical markers according to an embodiment of the present disclosure.

In an embodiment, with reference to FIG. 5C, FIG. 5C is a partial enlarged view of FIG. 5A. The graphical marker (510) in FIG. 5A has four corners (552), (554), (556), and (558) shown in FIG. 5C. The graphical marker used has the property that it does not have rotation symmetry. Accordingly, there is no orientation ambiguity of the four corners. Coordinates of the four corners can be accurately detected by various algorithm mentioned and examples of which are shown in FIG. 3, which is not exhaustive, and other methods exist or new detection methods can also be used. Similarly, the graphical marker (516) in FIG. 5A has four corners (560), (562), (564), and (566) as shown in FIG. 5C. The sub-region (514) can be defined by corners (554) and (558) of the graphical marker (510) and corners (560) and (562) of the graphical marker (516). In the embodiment, the above step S1012 may include following steps as shown in FIG. 12.

At step S1202, a perspective transformation matrix is computed according to coordinates of two corners of a first detected graphical marker which are adjacent to a second detected graphical marker and coordinates of two corners of the second detected graphical marker which are adjacent to the first detected graphical marker; the first detected graphical marker and the second detected graphical marker form a pair of graphical markers.

Specifically, as an example, one algorithm to compute the perspective transformation matrix is provided in the document "Lepetit, V; Moreno-Noguer, M.; Fua, P. (2009); 'EPnP: An Accurate O(n) Solution to the PnP Problem'; International Journal of Computer Vision. 81 (2): 155-166", and the specific computing process is not repeated herein.

At step S1204, a perspective distortion of a sub-region of the graphical watermark bounded by a pair of graphical markers is corrected by using the perspective transformation matrix.

At step S1206, a corresponding sub-region in the watermark reference is determined according to the position and pose information of the pair of graphical markers.

At step S1208, the similarity or correlation score between the sub-region in the graphical watermark in which the perspective distortion is corrected and the corresponding sub-region in the watermark reference is computed.

Specifically, the similarity or correlation score can be a percentage of values which are the same between the watermark reference and the graphical watermark in which the perspective distortion is corrected. One way to compute the similarity is to threshold the values in the perspective corrected watermark, and compare with the values in the watermark reference. For example, the perspective corrected watermark is an image containing pixels of value 0 to 255. A threshold is applied to convert the value to a range of 0 to 1. For example, if the value are greater than 127, then the value is converted to 1 by applying the threshold; else 0. The watermark reference is also an image which contains pixels of value 0 or 1. The comparison is configured to check each pixel between the image and the reference. If the value for that pixel is the same, then it is correct and given a score of 1 point. The overall score can be represented as the percentage, i.e., the overall score is equal to total correct points/total number of pixels.

Figure 13:
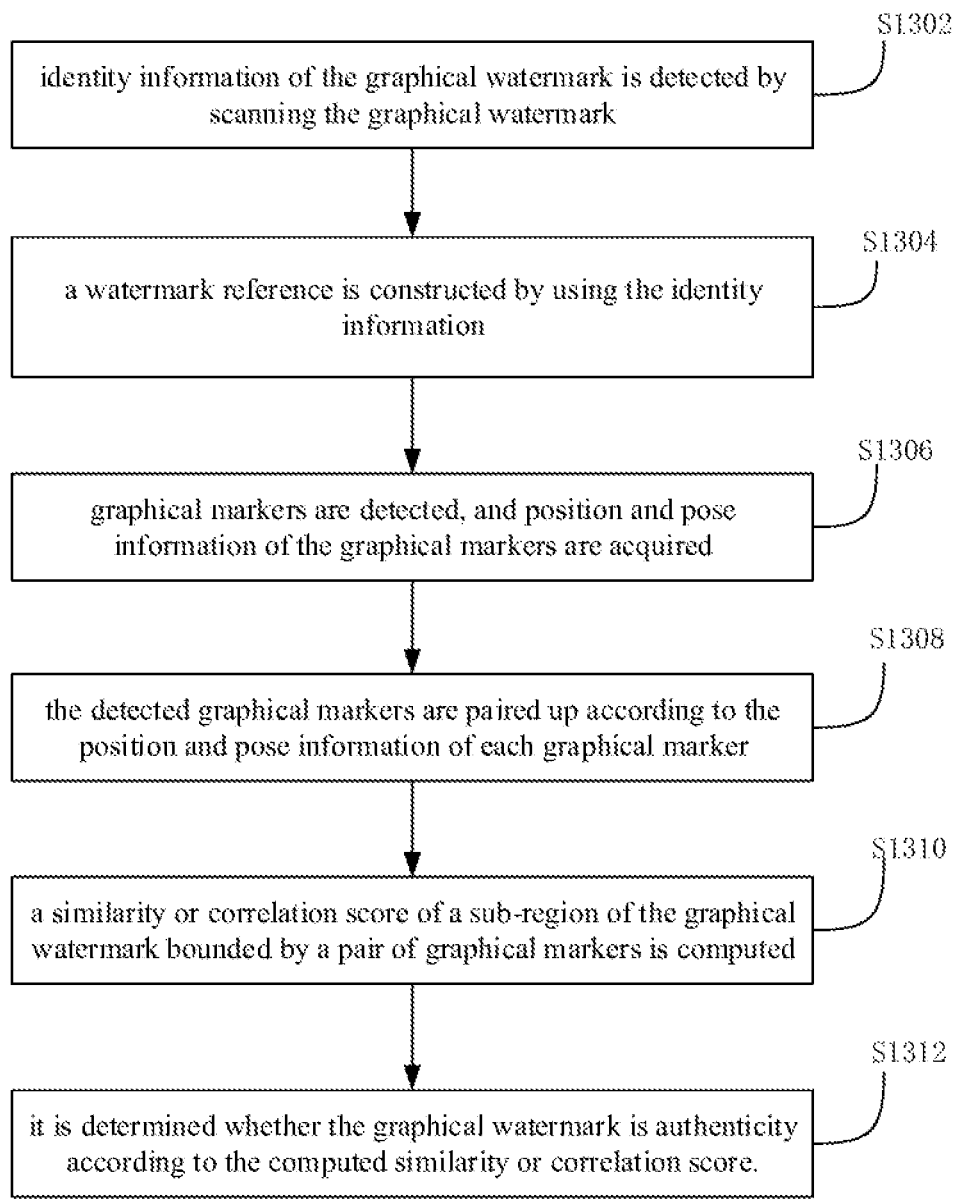
FIG. 13 is a flow chart showing a method for authenticating a graphical watermark according to an embodiment of the present disclosure.

In an embodiment of the present disclosure, referring to FIG. 13, a method for authenticating a graphical watermark is provided. In this example, an image pre-captured by a mobile device and uploaded to a server is used. Specifically, the method may include the following steps.

At step S1302, identity information of the graphical watermark is detected by scanning the graphical watermark.

Specifically, the identity information can be embedded into a QR code; alternatively, the identity information can also be split into several portions and each portion is embedded into a graphical marker.

At step S1304, a watermark reference is constructed by using the identity information.

This is because the watermark pattern can be unique for each code. The watermark reference could be encrypted and stored in a database of the server, but it would consume a large amount of storage space. Alternatively, a seed to the random generator configured to generate the watermark pattern could be stored. Alternatively, in a preferred way, a secret key configured to derive the seed of the random generator is stored instead. It is preferred because there exists HSM (Hardware Security Module) available in the market that is well-known for protecting secret keys. Other solutions for secret key management also exists.

At step S1306, graphical markers are detected, and position and pose information of the graphical markers are acquired.

At step S1308, the detected graphical markers are paired up according to the position and pose information of each graphical marker.

Specifically, this step S1308 is needed because not all graphical markers are visible in the image and in some case, even if the graphical marker is visible, it might not be detectable by the algorithm. For the graphical markers that are detected, it is necessary to pair them up.

At step S1310, a similarity or correlation score of a sub-region of the graphical watermark bounded by a pair of graphical markers is computed.

Methods to compute the watermark similarity or correlation score has been mentioned in the example of FIG. 12, which is not repeated herein.

At step S1312, it is determined whether the graphical watermark is authenticity according to the computed similarity or correlation score.

Specifically, a threshold can be preset to determine whether the graphical watermark is authenticity. If the similarity or correlation score is greater than the threshold, the authentication is successful, and the graphical watermark is authentic. Otherwise, the authentication has failed.

In an embodiment of the present disclosure, an apparatus for generating a graphical watermark is provided, and the apparatus specifically includes:

a generation module configured to: generate a plurality of graphical markers carrying position and pose information and identity information, in which a pair of adjacent graphical markers bound a sub-region having a flat surface; and generate a watermark pattern and provide the watermark pattern between the pair of adjacent graphical markers to form the graphical watermark.

In an embodiment of the present disclosure, an apparatus for authenticating a graphical watermark is provided, and the apparatus specifically includes:

an acquisition module configured to acquire identity information of a graphical watermark;

a construction module configured to construct a watermark reference according to the identity information;

a detection module configured to detect a plurality of graphical markers of the graphical watermark and acquire position and pose information of each graphical marker;

a computation module configured to pair up the detected graphical markers according to the position and pose information of each graphical marker, and compute a similarity or correlation score of a watermark pattern bounded by a pair of graphical markers according to the watermark reference, where a sub-region bounded by the pair of graphical markers in which the watermark pattern is located has a flat surface;

a determination module configured to determine whether the graphical watermark is authentic according to the similarity or correlation score.

In an embodiment of the present disclosure, a computer device is provided, which includes a processor and a memory storing computer-readable instructions, the processor, when executing the computer-readable instructions, perform the steps of:

generating a plurality of graphical markers carrying position and pose information, and identity information of the graphical watermark, a pair of graphical markers bound a sub-region having a flat surface; generating a watermark pattern and providing the watermark pattern between the pair of graphical markers to form the graphical watermark.

In an embodiment of the present disclosure, a computer device is provided, which includes a processor and a memory storing computer-readable instructions, the processor, when executing the computer-readable instructions, perform the steps of:

acquiring identity information of a graphical watermark by scanning the graphical watermark;

constructing a watermark reference is constructed according to the identity information;

detecting a plurality of graphical markers of the graphical watermark, and acquiring position and pose information of each graphical marker;

pairing up the detected graphical markers according to the position and pose information of each graphical marker, and computing a similarity or correlation score of a watermark pattern bounded by a pair of graphical markers according to the watermark reference, where a sub-region bounded by the pair of graphical markers in which the watermark pattern is located has a flat surface;

determining whether the graphical watermark is authentic according to the similarity or correlation score.

In an embodiment of the present disclosure, a non-transitory computer-readable storage media storing computer-readable instructions is provided, a processor, when executing the computer-readable instructions, performs following steps of:

generating a plurality of graphical markers carrying position and pose information and identity information, in which a pair of adjacent graphical markers bound a sub-region having a flat surface; and generating a watermark pattern and providing the watermark pattern between the pair of adjacent graphical markers to form the graphical watermark.

In an embodiment of the present disclosure, a non-transitory computer-readable storage media storing computer-readable instructions is provided, a processor, when executing the computer-readable instructions, performs following steps of:

acquiring identity information of a graphical watermark by scanning the graphical watermark;

constructing a watermark reference is constructed according to the identity information;

detecting a plurality of graphical markers of the graphical watermark, and acquiring position and pose information of each graphical marker;

pairing up the detected graphical markers according to the position and pose information of each graphical marker, and computing a similarity or correlation score of a watermark pattern bounded by a pair of graphical markers according to the watermark reference, where a sub-region bounded by the pair of graphical markers in which the watermark pattern is located has a flat surface;

determining whether the graphical watermark is authentic according to the similarity or correlation score.

It should be noted that the present disclosure may be implemented in software and/or a combination of software and hardware, e.g., may be implemented using an disclosure specific integrated circuit (ASIC), a general purpose computer, or any other similar hardware apparatuses. In an embodiment, the software program of the present disclosure can be executed by a processor to implement the steps or functions described above. Similarly, the software programs of the present disclosure, including associated data structures, can be stored in a computer-readable recording medium, such as, for example, a RAM storage, a magnetic or optical drive, or a floppy disk, and the like. In addition, some of the steps or functions of the present disclosure can be implemented in hardware, for example, as circuitry that cooperates with a processor to perform various steps or functions.

In addition, part of the present disclosure can be applied as a computer program product, such as a computer program instruction, which, when executed by a computer, can call or provide a method and/or solution of the present disclosure by an operation of the computer. The program instruction calling the method of the present disclosure can be stored in a fixed or removable recording medium, and/or can be sent through a data stream in a broadcast or other signal carrying media, and/or can be stored in a working memory of a computer device running according to the program instruction. Here, an embodiment according to the present disclosure provides an apparatus including a memory for storing a computer program instruction and a processor for executing the program instruction, when the computer program instruction is executed by the processor, the apparatus is triggered to execute a method and/or a solution based on the foregoing embodiments of the present disclosure.

It should be apparent to those skilled in the art that the present disclosure is not limited to the details of the exemplary embodiments described above, and that the present disclosure can be implemented in other specific forms without departing from the spirit or essential characteristics of the present disclosure. Accordingly, the examples are considered in all respects as exemplary and non-limiting, the scope of the present disclosure is defined by the appended claims rather than the foregoing description, and all changes that fall within the meaning and range of equivalency of the claims are therefore included in the present disclosure. Any reference signs in the claims shall not be construed as limiting the claims to which they relate. Also, it is obvious that the word "including" does not exclude other units or steps, and the singular does not exclude the plural. The plurality of units or apparatuses recited in the system claims can also be implemented by one unit or apparatus by means of software or hardware. The first, second, and the like are used for denoting names rather than any particular order.

What is claimed is:

1. A graphical watermark, comprising:
   a plurality of graphical markers carrying position and pose information, and identity information of the graphical watermark; and
   a watermark pattern provided between a pair of graphical markers.

2. The graphical watermark according to claim 1, wherein a sub-region bounded by the pair of graphical markers has an approximately flat surface when the graphical watermark is applied onto a non-flat surface.

3. The graphical watermark according to claim 1, further comprising:
   a QR code, wherein the identity information of the graphical watermark is encoded in the QR code.

4. The graphical watermark according to claim 1, wherein the identity information is split into a plurality of portions and each portion is embedded into one graphical marker.

5. The graphical watermark according to claim 1, wherein the position information is configured to indicate a relative position of the graphical marker in the graphical watermark, the pose information is configured to indicate an orientation of the graphical marker in the graphical watermark, and the identity information is configured to construct the graphical watermark.

6. The graphical watermark according to claim 1, wherein each graphical marker does not have a rotation symmetry.

7. A method for generating a graphical watermark, comprising:
   generating a plurality of graphical markers carrying position and pose information, and identity information of the graphical watermark, a pair of graphical markers bound a sub-region having a flat surface;
   generating a watermark pattern and providing the watermark pattern between the pair of graphical markers to form the graphical watermark.

8. The method according to claim 7, further comprising:
   generating a QR code carrying identity information of the graphical watermark.

9. The method according to claim 7, wherein the generating the watermark pattern and providing the watermark pattern between the pair of graphical markers to form the graphical watermark comprises:
   generating a secret key;
   computing a hash function of the QR code or the identity information in the QR code by means of the secret key;
   obtaining a random number generator by a digest from the hash function;
   generating the graphical watermark by the random number generator.

10. The method according to claim 9, further comprising:
    encrypting the secret key by a storage key; and
    storing the encrypted secret key into a database.

11. The method according to claim 7, further comprising:
    encrypting the graphical watermark by using a public key of a recipient;
    transmitting the encrypted graphical watermark to the recipient for printing.

12. The method according to claim 7, further comprising:
    storing the generated graphical watermark in a server as a watermark reference, after generating the watermark pattern and providing the watermark pattern between the pair of graphical markers to form the graphical watermark.

13. The method according to claim 7, wherein the generating a plurality of graphical markers carrying position and pose information and identity information of the graphical watermark further comprises:
    acquiring the identity information of the graphical watermark from a server;
    splitting the identity information into a plurality of portions;
    adding an additional bit of data to each portion such that each portion has a data sequence with a same number of bits;
    converting each portion into a corresponding graphical marker;
    wherein a data sequence of one of the plurality of portions comprises header information which is configured to indicate a type of the graphical watermark, a total number of the portions;
    wherein the type of the graphical watermark comprises an arrangement of the plurality of graphical markers.

14. A method for authenticating a graphical watermark, comprising:
    acquiring identity information of a graphical watermark by scanning the graphical watermark;
    constructing a watermark reference according to the identity information;
    detecting a plurality of graphical markers of the graphical watermark, acquiring position and pose information of each graphical marker;
    pairing up the detected graphical markers according to the position and pose information of each graphical marker, and computing a similarity or correlation score of a watermark pattern bounded by a pair of graphical markers according to the watermark reference; and
    determining whether the graphical watermark is authentic according to the similarity or correlation score.

15. The method according to claim 14, wherein the acquiring identity information of a graphical watermark by scanning the graphical watermark comprises: acquiring and combining identity information split and encoded in the plurality of graphical markers of the graphical watermark.

16. The method according to claim 14, wherein the graphical watermark comprises a QR code, and the acquiring identity information of a graphical watermark by scanning the graphical watermark comprises: acquiring the identity information from a server by scanning the QR code of the graphical watermark.

17. The method according to claim 14, wherein the acquiring position and pose information of each graphical marker comprises:

acquiring parameters from the server according to the identity information, wherein the parameters comprise an amount of zoom, and position and pose information of the graphical markers.

18. The method according to claim 14, wherein the computing a similarity or correlation score of a watermark pattern bounded by a pair of graphical markers according to the watermark reference comprises:

computing a perspective transformation matrix according to coordinates of two corners of a first graphical marker which are adjacent to a second graphical marker and coordinates of two corners of the second graphical marker which are adjacent to the first graphical marker, wherein the first graphical marker and the second graphical marker form the pair of graphical markers;

correcting a perspective distortion of a sub-region in the graphical watermark bounded by the pair of graphical markers by using the perspective transformation matrix;

acquiring a corresponding sub-region in the watermark reference according to the position and pose information of the pair of graphical markers;

computing the similarity or correlation score between the sub-region in the graphical watermark in which the perspective distortion is corrected and the corresponding sub-region in the watermark reference.

19. The method according to claim 14, wherein the similarity or correlation score is a percentage of values which are the same between the watermark reference and the graphical watermark in which the perspective distortion is corrected.

20. The method according to claim 14, wherein the determining whether the graphical watermark is authentic according to the similarity or correlation score comprises:

comparing the similarity or correlation score to a preset threshold, and determining the graphical watermark is authentic if the similarity or correlation score is greater than the preset threshold.

* * * * *

UNITED STATES PATENT AND TRADEMARK OFFICE
CERTIFICATE OF CORRECTION

| | | |
|---|---|---|
| PATENT NO. | : 12,289,405 B2 | Page 1 of 1 |
| APPLICATION NO. | : 17/867076 | |
| DATED | : April 29, 2025 | |
| INVENTOR(S) | : Chin Phek Ong | |

It is certified that error appears in the above-identified patent and that said Letters Patent is hereby corrected as shown below:

On the Title Page

Item (73) Assignee, Please change "I-SPRINT INNOVATIONS PTE LTD" to --I-SPRINT TECHNOLOGIES PTE LTD--.

Signed and Sealed this
First Day of July, 2025

Coke Morgan Stewart
*Acting Director of the United States Patent and Trademark Office*